Feb. 16, 1971     C. J. FRIEDMAN ET AL     3,562,922
CARD PROGRAMMED TEACHING MACHINE
Filed July 5, 1968     4 Sheets-Sheet 1
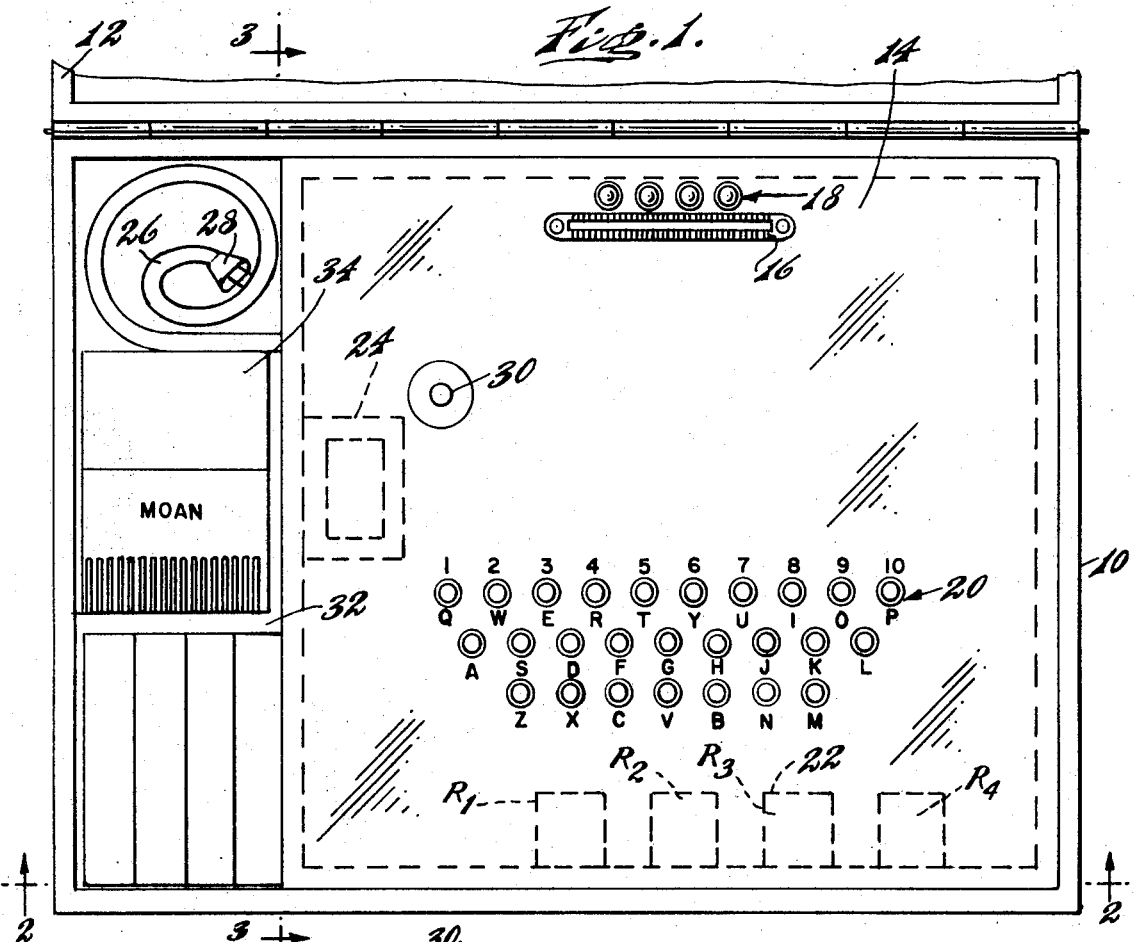
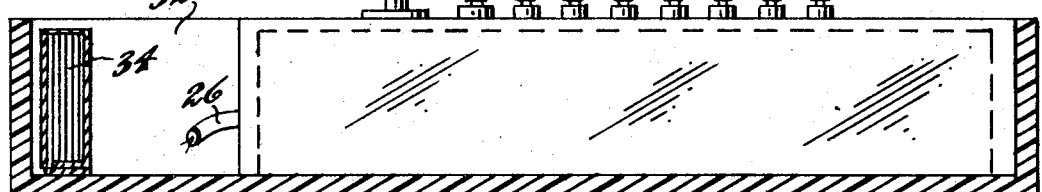
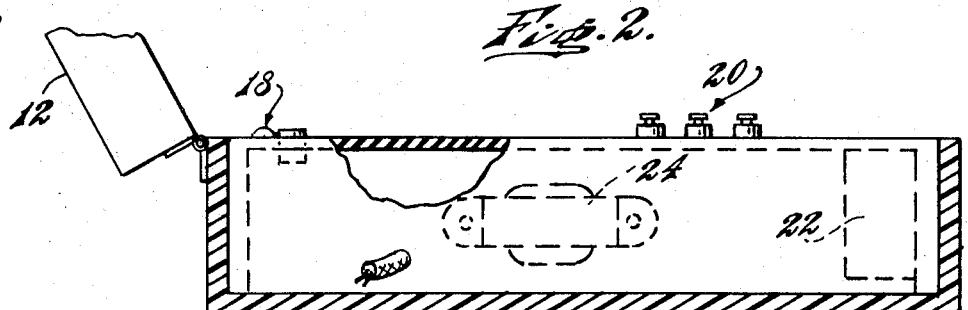
INVENTORS
Jack Friedman
Paul Gorman
BY
Karl L. Spivak
ATTORNEY Feb. 16, 1971     C. J. FRIEDMAN ET AL     3,562,922
CARD PROGRAMMED TEACHING MACHINE
Filed July 5, 1968     4 Sheets-Sheet 2
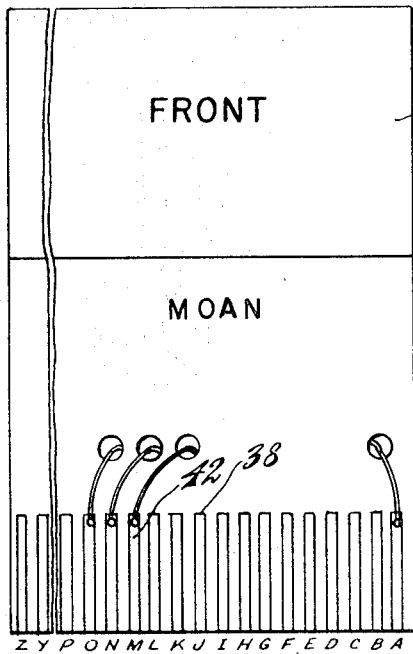
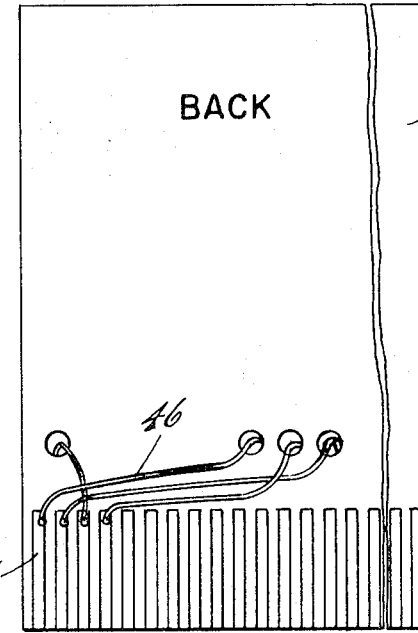
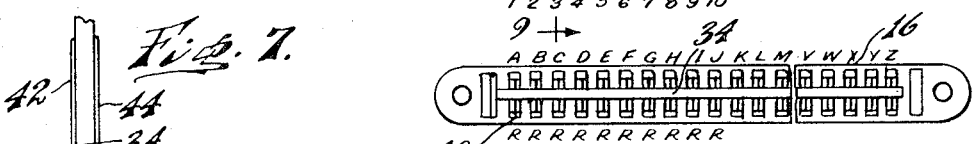
INVENTORS.
Jack Friedman
Paul Gorman
BY Karl L. Spivak
ATTORNEY

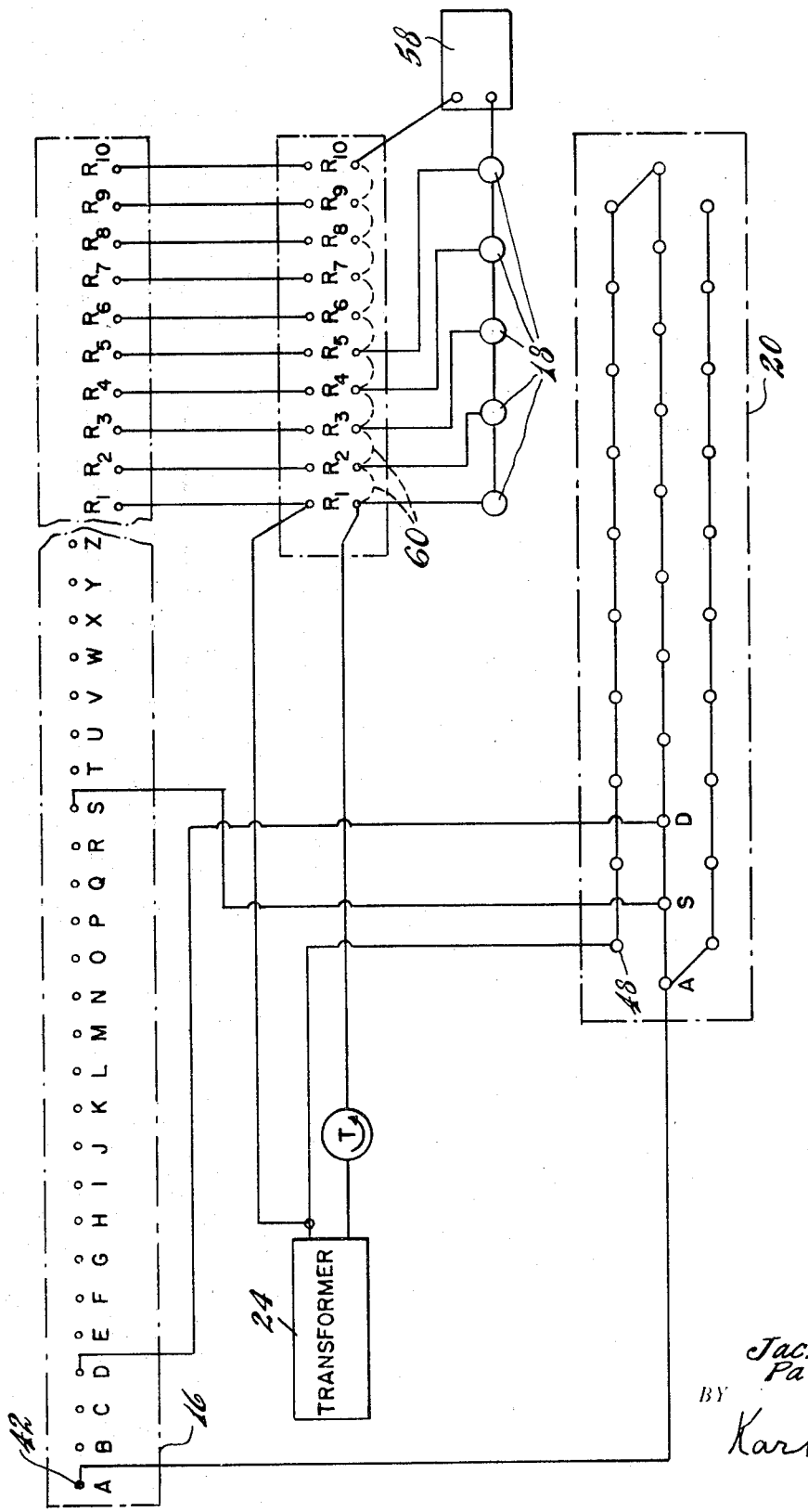

Feb. 16, 1971  C. J. FRIEDMAN ET AL  3,562,922
CARD PROGRAMMED TEACHING MACHINE
Filed July 5, 1968  4 Sheets-Sheet 4
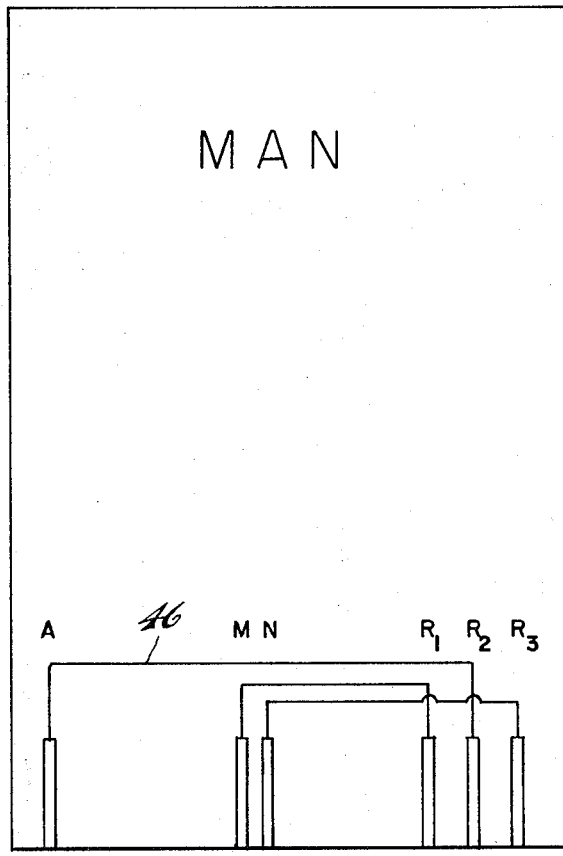
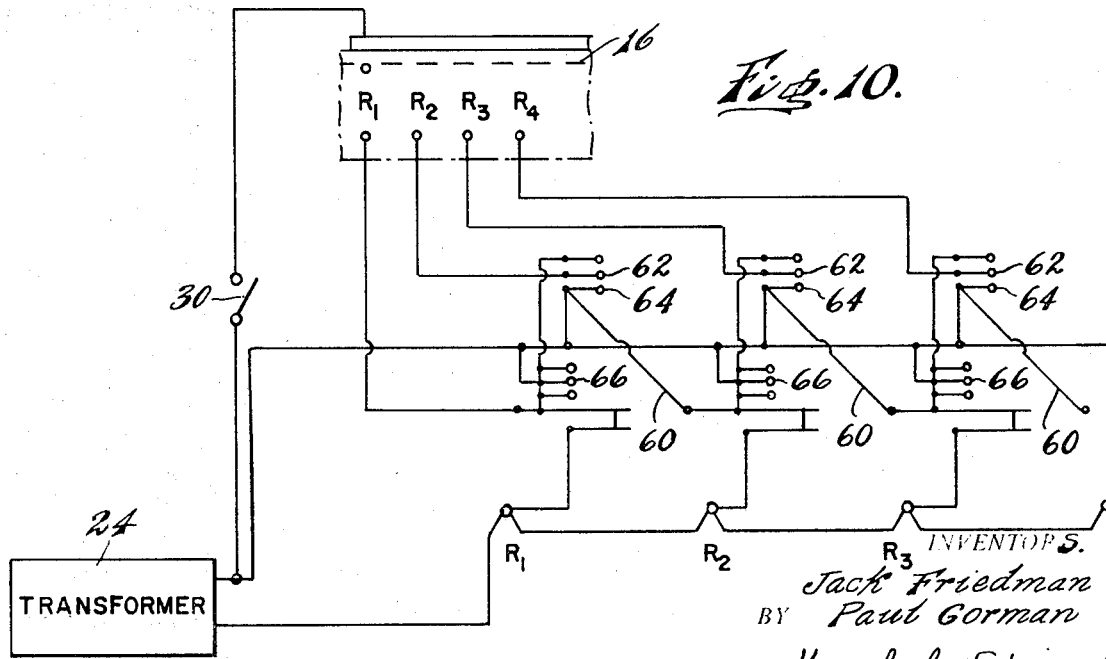
INVENTORS.
Jack Friedman
BY Paul Gorman
Karl L. Spivak
ATTORNEY

United States Patent Office 3,562,922
Patented Feb. 16, 1971

3,562,922
CARD PROGRAMMED TEACHING MACHINE
Clarence Jack Friedman and Paul Gorman, both of 9726
Susan Road, Philadelphia, Pa. 19115
Filed July 5, 1968, Ser. No. 742,756
Int. Cl. G09b 7/02
U.S. Cl. 35—9                                     1 Claim

ABSTRACT OF THE DISCLOSURE

A card programmed teaching machine including a keyboard, circuits leading to a multipin connector socket through operative relays and programmed cards insertable within the said socket to set the entire apparatus for operation. The card determines which keys on the keyboard will activate the relays, which in turn feed annunciator lights to indicate the correctness of a part of the total response. The relays operate in sequence with each succeeding relay controlling the operation of the following relay.

---

The present invention relates to the general field of teaching aids and more particularly is directed to an electrical teaching machine including a keyboard wired to a multipin connector socket which is utilized to program the device in response to the insertion of program cards within the said socket.

The apparatus consists of a keyboard and a viewing section where the stimulus materials such as programmed cards are presented. The said programmed cards are fabricated from nonconducting materials such as fiber-glass or plastic and are provided with a printed circuit to program the device in response to the information contained on the card. The card is manually or automatically inserted within a multipin type of connector to activate preselected circuits and to set the entire apparatus for operation. The card controls which keys and which sequence will activate a series of relays to correctly respond to the information contained on the card. The relays respectively control annunciator lights which in turn indicate the correctness of the unit of the total response. The annunciator lights may be located behind the card to display, when lighted, that unit of the response, and to remain lighted through the entire response until the apparatus is reset. The contacts on the relay, close a circuit to annunciator lights which in turn indicate the correctness of a unit of the response, as for example a letter in a word or a numeral (digit) in arithmetical problems. The first relay, the activation of which depends upon pressing the key for which that is programmed by the circuit card, is self latching and must be activated before the second relay can be activated. The second relay in turn, once activated, completes the circuit for the next relay to be activated, etc.

The device is suitable for teaching reading, spelling and arithmetic and the keyboard may consist either of letters of the alphabet arranged as on a standard typewriter, or optionally, can similarly be marked with numerals. The stimulus card employed for use with the apparatus shows a graphic representation of the word or mathematical problem and is manually or automatically inserted into the multipin connector socket to program the device for response by the pupils. The removal of the stimulus cards from the socket resets the apparatus by opening the circuit and releasing the relays. If the power supply to the relays is circuited through the program card, then the removal of the card will automatically reset the apparatus. The relays are arranged in series connections and as many relays as desired for any word length may be conveniently provided.

The apparatus can also be equipped with optical features such as a counter for the number of words successfully completed, an error counter which gives the total numbers of letters incorrectly chosen, an internal timer which may be utilized to control the operation of the apparatus for a variable preset period or interval of time, and which automatically resets if the correct sequence of letters has not been completed, or optionally, registers a visual signal or an auditory signal when the time has run out. In addition, the keys can be utilized to yield letters numbers, etc., in either capitals or lower case or both for purposes of teaching capitals and lower case differences. The machine may also be programmed to properly respond to questions presented on the cards which are answerable by a "true" or "false" or "yes" or "no" type of response. The machine may also be programmed to properly respond to questions presented on the card which require selection of the correct response from multiple answers which are designated by letters "A," "B," "C," "D" and "E." In such cases, additional keys or buttons appropriately labeled (or designated) may be added to the keyboard and connected to the existing circuits. Where the correct response is one unit of information, as "yes" or a letter designating one of several choices, the annunciator light in the index position would be turned on by the correct response, and would display the appropriate letter or word (e.g., "yes"). Likewise the machine may also be programmed to require the pupil to type out the entire response (e.g., word).

The apparatus can also be readily adapted for arithmetic learning. In one method, a plate may be used to cover the original letter board, thereby substituting numbers for the letters and employing various symbols to indicate decimals or mathematical operations. Such operations can include complex functions such as square root or fractions and the problems to be solved are visibly imprinted on the card itself. In a second manner, for simple arithmetic, it is possible to substitute numbers for letters at the initial row of the keyboard. In this manner, either the key itself can be replaced, a number tape substituted for the letter tape, or else the key can be initially dual labeled to indicate both letters and numbers. The circuit can be modified by the circuit card or by a separate switch to reverse the sequence of actuation of the relays to accommodate arithmetical problems as in addition, subtraction or multiplication where the solution of the problem proceeds from right to left. If this is controlled by the circuit card, such reversal would automatically be avoided for division.

If desired, the apparatus can be further modified by utilizing a bank of digits, as in a calculator, in an area to the side of the device with simple switching control operated either by the circuit card or by a separate switching device to substitute the bank of digits for the letters.

The apparatus is uniquely suitable to the teaching of perception and discrimination. In this instance, a substituted keyboard may be placed over the original letter board. Each key may then be labeled as a color or a geometric shape or any similar desired indicia. The programmed card must be marked with the desired stimuli and the operator can then match the letters with that appearing on the card. Also, to enhance perceptual acuity partial letters may be utilized on the program card in conjunction with actual keyboard letters. In this manner, beginning students may be readily taught to recognize the shape of both letters and numbers. The apparatus is also uniquely suited to the teaching of any body of content where the sequence of alternatives is important. The programmed card, for example, may contain statements designated by numbers but presented in random order to teach, for instance, the operation of machinery where sequential steps are necessary, or disease syndromes where symptoms are ordered as to privacy, or anatomy (e.g., such things as the cranial nerves) or historical material where the sequence represents the chronology of events (sequence of presidents, kings, etc. in history, or levels of control as in government) etc. or the phylo in biology, or the content of any course of study where sequence is ordered.

The apparatus is further uniquely suited to teaching concepts, symbolic thinking or other higher intellectual functions. The circuit card may graphically display four pictures with a given stimulus card associated with one of the pictures, where the correct response is the letter or number designating the picture; or where the picture represents a part of speech; or an incomplete picture where one of several stimulus words indicates the correct, missing part or element, etc.

Prior art devices have incorporated progammed cards which may be inserted into the device wherein the actuation of proper keys result in the storing of information within the device. Another prior art teaching device includes the insertion of a plurality of cards one at a time, wherein the question appears in the window of the machine, and if the proper answer is given, the card relocates to expose the answer which is also printed on the card. Another prior device illustrates an educational machine whereby cards having a question and a plurality of answers is inserted into the machine. The lever on the machine is moved to select the proper answer and, if the correct answer is selected, an indication of this is given by the machine.

All of the prior art teaching machines as above set forth have one common shortcoming in that they are complicated in construction and all utilize parts and circuitry which are expensive in manufacture and assembly. Accordingly, all of the prior art teaching machines of which we are aware are very expensive in construction and manufacture, thereby making the purchase price to the eventual user extremely high. Because of the high cost of producing prior art teaching machines, such devices have found but limited acceptance and employment. Accordingly, in view of the importance of the field, it is extremely desirable to produce a meaningful teaching aid that is reliable, simple in operation and modest in cost, with multiple functions.

It is therefore an object of the instant invention to provide an improved card programmed teaching machine of the type set forth.

It is another object of the instant invention to provide a card programmed teaching machine utilizing readily available elements and inexpensive components.

It is another object of the instant invention to provide a card programmed teaching machine utilizing a multipin connector socket and a plurality of program cards insertable within the socket to set the entire apparatus for operation.

It is another object of the instant invention to provide a novel card programmed teaching machine incorporating sequence relays and annunciators to indicate the correct sequence of units of the response and of the total response.

It is another object of the instant invention to provide a novel card programmed teaching machine equally capable of operation both with letters of the alphabet and with numerals and other visual stimulus material as may be desired.

It is another object of the instant invention to provide a novel card programmed teaching machine suitable for teaching reading, spelling, arithmetic and perception.

It is another object of the instant invention to provide a novel card programmed teaching machine that is simple in construction and lightweight in nature so as to be completely portable.

It is another object of the instant invention to provide a novel card programmed teaching machine designed to program the circuits by insertion of a program card within a multipin connector socket and further designed to automataically reset the apparatus by opening the circuits and releasing the relays either by depressing a space bar or simply by removal of the card.

It is another object of the instant invention to provide a novel card programmed teaching machine that is inexpensive in manufacture, rugged in construction and trouble-free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 1 is a top plan view of a card programmed teaching machine constructed in accordance with the instant invention.

FIG. 2 is a cross-sectional view taken along Line 2—2 of FIG. 1, looking in the direction of the arrows.

FIG. 3 is a cross-sectional view taken along Line 3—3 of FIG. 1, looking in the direction of the arrows.

FIG. 4 is a front elevational view of a spelling card.

FIG. 5 is a rear elevational view of the spelling card of FIG. 4.

FIG. 6 is an enlarged plan view of the multipin connector socket.

FIG. 7 is an enlarged cross sectional view taken along Line 9—9 of FIG. 6 showing the programmed card in inserted position.

FIG. 8 is a schematic wiring diagram of the device.

FIG. 9 is a schematic wiring diagram of a program card.

FIG. 10 is a schematic wiring diagram of the device showing particularly the wiring connections at the relay section.

Although specific terms are used in the following description for the sake of clarity, these terms are intended to refer only to the particular structure of our invention selected for illustration in the drawings and are not intended to define or limit the scope of the invention.

Referring now to the drawings, we show in FIG. 1 an equipment carrying case 10 which may be provided with a hinged cover 12 and a carrying handle (not shown) to make the unit entirely portable and to facilitate carrying from location to location. An equipment board 14 mounts within the case 10 and carries the upwardly facing multipin connector socket 16, the annunciator lights 18 and the operating keyboard 20. The sequential relays 22, the transformer 24 and the circuitry wiring mount below the equipment board and are secured thereto in conventional manner. An electrical cord 26, which terminates in a conventional plug 28, feeds the transformer 24 through the board mounted on-off switch 30. The space 32 between the equipment board 14 and the case 10 serves as a storage area to hold a plurality of program cards 34, the coiled up cord 26, instructions, etc.

As best seen in FIG. 1, the visible apparatus essentially consists of a keyboard 20 arranged upon the equipment board 14 and a connector socket 16 arranged to receive the program cards 34. When a card 34 inserts into the connector socket 16, the apparatus is then set for operation. The card controls which keys, and in which sequence a series of sequential relays 22 will operate. The relays 22 control the function of a plurality of annunciator lights 18 which in turn indicate the correctness of a unit of the response. Each program card 34 comprises a body of nonconducting material such as fiberglass or other suitable plastic material and a conductive printed circuit printed at the bottom thereof in accordance with well established principles.

Referring now to FIGS. 4 and 5, we show a program card 34 comprising a relatively rigid, thin, rectangular body 36 fabricated from nonconductive material such as fiberglass, plastic or other suitable composition. In the illustration shown, the word "Moam" is set forth and is visibly imprinted on one side of the card 34 for the use of the instructor. A plurality of vertically spaced, electrically conductive contacts 38 affix to both sides of the card 34 at the bottom thereof for eventual interactions with the contacts of the connector socket 16. The front of the card carries the letter contacts A through Z and the reverse side carries the relay contacts R1–R4 (for a four-letter word card). The contacts 38 are arranged in spaced relationship to exactly correspond to the respective position of the multipin contacts 40 carried by the connector socket 16. In this manner, when the card 34 is inserted within the connector socket 16, the card contacts 38 interact with the multipin contacts 40 within the connector socket to thereby selectively activate the desired electrical circuits.

As shown in FIGS. 4 and 5, each letter contact 42 utilized to spell a selected word respectively activates a relay contact 44 through a mutually connected printed circuit portion 46 which is electrically conductive, in well known manner. Thus, the contact 42 for letter "M" connects to the first relay contact 44 through the printed circuit 46. In this manner, the first sequential relay R1 must be activated by pressing letter "M" on the keyboard 20 in order to successfully respond to the particular card 34 illustrated. The operation of the electrical circuit and the sequential relays will hereinafter be more fully set forth.

As best seen in FIGS. 6 and 7, the multipin connector socket 16 carries a plurality of spaced contacts 40 in slightly inclined relationship to thereby provide spring action to receive and hold the program card 34 when it inserts within the socket 16. The socket contacts 40 include letter contacts A through Z and relay contacts R1–R10 which align with the program card contacts 42, 44 in well known manner so that a plurality of electrical circuits may be sequentially completed through operation of the keyboard 20, the sequential relays 22 and the annunciator lights 18. In the card selected for illustration, the latter "M" should be pressed first and accordingly, the latter "M" on the program card 34, connects to the first relay R1 through the printed circuit portion 46. Similarly, the letter "O" should next be pressed and therefore, the contact "O" on the card 34 connects to the second relay contact 44 through the printed circuit portion 46 to activate the second relay R2. Similarly, the letter "A" should be pressed in the third sequential order and therefore, the contact 42 for letter "A" connects with the contact 44 to activate the third relay R3. Finally, the letter "N" should be pressed last and therefore, the letter "N" contact 42 on the card 34 connects to the fourth relay contact 44 on the rear of the card 34 to thereby activate the fourth relay R4. In this manner, the card 34, when it inserts into the multipin socket 16 energizes the relay circuits in the order of one through four corresponding sequentially to the letters "MOAN." It will be appreciated that as many additional relays, for example, relays R5–R10, may be employed as desired to accommodate words having a greater number of letters.

As presently arranged, the apparatus functions on one hundred and ten volts normal alternating electrical current supplied through the electrical cord 26 when it is plugged into a conventional electrical outlet (not shown) by utilizing the electrical plug 28. The cord 26 feeds the one hundred and ten volt-six volt step down transformer 24 to thereby impress six volt electrical current across each of the relays R1, R2, R3, R4. Optionally, the entire apparatus could be powered through a conventional six volt, direct current battery system which may be of the rechargeable type, thereby eliminating need for the cord 26 and the transformer 24. Such a modification falls within the scope and meaning of the present disclosure and renders the apparatus even more portable when such a feature is desirable.

Referring now to FIGS. 8 and 10, a schematic wiring diagram is set forth to best illustrate the method and sequence of the electrical circuit operation. As shown, each key 48 of the keyboard 20 individually connects to one of the multipin letter contacts 42 of the connector socket 16. It will be seen that the key letter "A" connects to the socket contact "A," the key letter "B" connects to the socket contact "B" and so on until all letters of the keyboard individually connect to one of the multipin contacts 40 of the connector socket 16. Only the circuits for the letters "S" and "D" are shown for the purpose of illustration, and it will be appreciated that each letter of the keyboard is similarly wired to its corresponding socket contact 42.

Similarly, the relays R1, R2, R3, R4 are wired in series and powered by the transformer 24 optionally through a clock timer 58 when it is desired to use such a device. Each relay respectively connects to the corresponding relay contact 44 which is carried within the connector socket as hereinbefore described to thereby provide a plurality of individual relay circuits for sequential monitoring of the keyboard 20 operation. The clock timer 58 may be optionally wired into the circuits to monitor a timed rate of response. For example, a one minute response period may be preset upon the timer. Failure of the pupil to complete the program problem within the time period of operation will automatically open the circuit to indicate an unsatisfactory response.

In order to use the card programmed teaching machine, a preselected program card 34 should be inserted into the connector socket 16 to thereby program the device with the card contacts 38 respectively contacting the corresponding socket letter contacts 42 and relay contacts 44. In this manner, the desired program is immediately and automatically impressed upon the teaching machine. By pressing the keys of the keyboard 20 in proper sequential order as programmed by the card 34, the latching relays R1, R2, R3, R4 may thus be energized in sequential order. The individual annunciator lights 18 are respectively wired into the relay circuits to illuminate upon operation of a relay to thereby visually indicate the correctness of a response. Should a key be pressed out of its correct sequence, the relay 22 will not operate, and consequently, the annunciator light 18 also will not function.

Upon insertion of a program card 34 within the connector socket 16, a sequential program of operation is impressed upon the device. The card printed circuit 46 connects each letter contact 42 in order to the next sequential relay contact 44. As best seen in FIGS. 8 and 10, each respective relay R1–R10 wires in series to the next sequential relay through the respective relay series wires 60. Thus, a subsequent relay, for example R2, cannot function until the preceding relay R1 has been activated by depressing the proper letter key of the keyboard 20 to activate the relay through the program card 34. An initial first letter key response that is correct activates the relay R1 at the lower contact 66 thereof and simultaneously illuminates the first communicator lamp 18 as a visual indication of the correctness. A second proper letter key response closes the upper relay contacts 62, 64 of relay R1 and serves to energize the series relay wire 60 to activate the next subsequent relay R2 at the lower contacts 66 thereof. It will be noted that the upper relay contacts 62, 64 are wired to the lower contacts 66 in the usual manner to prevent energization of the series wire 60 without first energizing the lower contacts 66. As indicated in FIG. 8, the communicator lights 18 wire in parallel across the respective series relay wires 60 for individual illumination to visually indicate a proper response.

What is claimed is:

1. In a card programmed teaching machine of the type employing a plurality of relays responsive to individual response keys and wired to a multicontact socket connector, adaptable to receive a plurality of program cards individually therein, the improvement comprising (A) a nonconductive card having two sides and a conductive circuit, (1) a plurality of response contacts being spaced on one side of the card,
(2) a plurality of relay contacts being spaced on the second side of the card,
    (a) the said conductive circuit connecting selective said responses contacts to selected relay contacts in the order of desired relay operation;
(B) the said socket connector having a plurality of spaced response contacts and a plurality of relay contacts,
    (1) said card response contacts and relay contacts respectively interacting with the socket connector response contacts when the card inserts within the socket connector; and
(C) a plurality of annunciator lights individually wired to be responsive to energization of respective relay contacts,
    (1) each said light functioning to visually indicate a correct response;
(D) a letter keyboard wired to the connector socket at the said response contacts thereof,
    (1) said keyboard including a response key corresponding to each letter of the alphabet; and
(E) a plurality of sequential relays wired for sequential operation,
    (1) each said relay connecting to one said relay contact,
    (2) each said relay being wired in series to the adjacent preceding relay whereby a subsequent relay cannot function until the preceding relay is activated by a correct response.

References Cited

UNITED STATES PATENTS 3,254,431  6/1966  Baker _____ 35—9

WILLIAM H. GRIEB, Primary Examiner

U.S. Cl. X.R.

35—35